United States Patent [19]

DiTullio

[11] Patent Number: 5,087,151
[45] Date of Patent: Feb. 11, 1992

[54] DRAINAGE SYSTEM

[76] Inventor: Robert J. DiTullio, 38 Hidden Brook Dr., Brookfield, Conn. 06804

[21] Appl. No.: 513,031

[22] Filed: Apr. 23, 1990

Related U.S. Application Data

[63] Continuation of Ser. No. 304,329, Jan. 30, 1989, abandoned.

[51] Int. Cl.⁵ .......................................... E02B 13/00
[52] U.S. Cl. ...................................... 405/43; 405/46; 405/49; 138/105
[58] Field of Search ................... 405/36, 39, 43–49, 405/124–126; 138/105, 121, 155, 173; 285/325; 210/170, 293

[56] References Cited

U.S. PATENT DOCUMENTS

| | | |
|---|---|---|
| D. 207,293 | 3/1967 | Ferm . |
| D. 207,294 | 3/1967 | Ferm . |
| 1,013,440 | 1/1912 | Rankin .................... 405/125 X |
| 2,366,522 | 1/1945 | Gutman . |
| 2,767,801 | 10/1956 | Eads . |
| 3,339,366 | 9/1967 | Gogan et al. . |
| 3,426,903 | 2/1969 | Olecko . |
| 3,440,823 | 4/1969 | Olsen . |
| 3,495,410 | 2/1970 | Bailey et al. . |
| 3,579,995 | 5/1971 | Flynn . |
| 3,645,100 | 2/1972 | La Monica . |
| 3,741,393 | 6/1973 | Estes et al. . |
| 3,747,352 | 7/1973 | Maroschak . |
| 3,820,341 | 6/1974 | Richard et al. . |
| 3,962,088 | 6/1976 | Kuhlenschmidt et al. .......... 210/170 |
| 4,192,628 | 3/1980 | Gorman ............................ 405/45 |
| 4,245,924 | 1/1981 | Fouss et al. ..................... 405/45 |
| 4,313,692 | 2/1982 | Johnson ............................ 405/43 |
| 4,325,823 | 4/1982 | Graham ............................ 210/86 |
| 4,360,042 | 11/1982 | Fouss et al. ..................... 138/119 |
| 4,363,732 | 12/1982 | Grates et al. ................... 210/532.2 |
| 4,523,613 | 6/1985 | Fouss et al. ..................... 138/121 |
| 4,588,325 | 5/1986 | Seefert ............................. 405/46 |
| 4,759,661 | 7/1988 | Nichols et al. ................... 405/48 |

OTHER PUBLICATIONS

Technical Support Paper for the Infiltrator Leaching System by Randy May, Apr. 1987, The Infiltrator Brochure.

Primary Examiner—Dennis L. Taylor
Assistant Examiner—John A. Ricci
Attorney, Agent, or Firm—Ware, Fressola et al.

[57] ABSTRACT

In septic systems for handling household waste water or in clear water drainage applications, lightweight molded polyethylene galleries are used to form the drain field. The galleries can be axially aligned in end-to-end relationship with each gallery defining an interior hollow chamber. A unique latching system is used to attach adjoining galleries to one another. A perforated delivery conduit extends through and introduces effluent into the hollow chambers of the galleries where it is allowed to seep therefrom into the surrounding earth through the open bottoms of the galleries or through infiltration apertures in the walls of the galleries.

16 Claims, 6 Drawing Sheets

DRAINAGE SYSTEM

This application is a continuation of 07/304,329, filed Jan. 30, 1989, now abandoned.

BACKGROUND OF THE INVENTION

The present invention relates generally to septic systems, and more particularly to a leaching or drainage system for a septic system which uses lightweight, vacuum-molded polyethylene gallery structures to form the leaching field.

In terms of volume, most of the water used in households around the United States is employed to carry off wastes, most of these wastes being organic and inorganic solids. Larger volumes of water are used for washing dishes, bathing and flushing the toilet than for drinking, cooking, washing cars, etc.

In urban areas, wastes carried by water from kitchens, bathrooms and laundry rooms are collected in a sewer system and transported to central sewage treatment plants. In rural areas and in unsewered suburban residential areas, individual septic systems are used to treat household waste. There are millions of such septic systems presently in use and being built in the United States. If properly designed, installed and adequately maintained, such a septic system will serve a household satisfactorily to treat household wastes.

In use, a septic system will condition household water carrying dirt, detergents, discarded food scraps and body wastes so that water may be readily percolated into the sub-soil of the surrounding ground. A typical septic system is comprised of a rectangular precast cement septic tank buried in the ground having a leaching or drain field extending therefrom. Household wastes or sewage flows to the septic tank under the influence of gravity from the house via a sewer line or pipe. The septic tank is a large, watertight and lighttight container in which the organic solids found in the sewage are decomposed by natural bacterial processes. Once the sewage is introduced into the tank, large solid particles sink, forming a sludge at the bottom of the tank while smaller, lighter particles as well as oils and greases rise to the surface forming a scum layer over a volume of liquid material located between the sludge and scum layers. Bacteria and other organisms in the tank break down and reduce the volume of the solids and scum. The bacteria cannot attack some of the material introduced into the system such as stone particles, plastic, etc. and these materials must be removed from the tank by periodic tank cleanings.

An outlet pipe is provided in the tank permitting some of the liquid material known as effluent to flow via hydrostatic pressure from the tank. The effluent still contains some decomposed solids as well as bacteria, viruses, etc. found in the tank and flows into an adjoining leaching or drain field where it must be permitted to percolate through the surrounding ground.

The leaching field has traditionally been a trench in the ground about eighteen inches (18") wide filled with gravel. A four inch (4") perforated pipe is located in the trench surrounded by the gravel. Laid over the gravel and the pipe is a layer of tar paper, salt hay or woven plastic cloth with a layer of top soil placed thereover. The pipe is set at an appropriate pitch to permit a desired flow of the effluent therealong under the influence of gravity. In use, the effluent runs down the perforated pipe from one end of the pipe to the other and flows out the apertures therein into the surrounding gravel and eventually into the surrounding ground.

Another type of leaching field is formed of precast concrete galleries which create space underground within a gravel bed to increase the volume of the field. These galleries are made in different shapes (rectangular, triangular) and are ideal for situations where there is insufficient area for the traditional pipe and gravel systems.

Some of the drawbacks of the traditional septic systems are that the septic tanks and leaching galleries have been made from precast concrete and are extremely heavy requiring heavy construction equipment to put them in place. In the leaching fields, the gravel used in constructing them is difficult to work with and expensive. It also tends to settle and reduces the overall volume of the trench by as much as seventy five percent (75%).

The present invention is designed to overcome the limitations that are attendant upon the use of traditional septic systems, and toward this end, it contemplates the provision of a novel drainage system which can be easily transported to the installation location.

It is an object of the invention to provide a septic system which employs lightweight vacuum-molded polyethylene gallery structures to form the leaching or drain field.

It is also an object to provide such a drainage system which is relatively light weight compared to precast concrete systems.

A further object is to provide such a drainage system which may be readily and economically fabricated and will enjoy a long life in operation.

SUMMARY OF THE INVENTION

It has now been found that the foregoing and related objects can be readily attained in a septic system having a leaching or drain field for receiving effluent from a septic tank in which household wastes are treated.

The drain field which allows effluent to seep into adjoining ground includes at least two drain field galleries. Each gallery comprises (1) an elongated main body portion having an arch-shaped configuration thereby creating an enlarged enclosure, (2) at least one end wall covering one end of the elongated main body portion, the end walls having an opening therethrough dimensionally sized to accept a perforated drain pipe for transporting the liquid to the gallery, and (3) a latching system associated with the end wall for attaching the gallery to an adjoining gallery in an end-to-end relationship.

Desirably, the latching system of the first gallery includes a flange on its at least one end wall. The flange is dimensionally sized to mate with an associated flange on the end wall of the adjoining gallery. These flanges are located at the lower terminal edges of galleries and extend outwardly from the end walls of the galleries. Each flange includes upstanding protuberances dimensionally sized to mate with protuberances on the other gallery to releasably secure the galleries together. The protuberances on each flange include one enlarged centrally located locking lug with locking tabs on either side thereof. Each centrally located locking lug partially surrounds an aperture in its associated end wall thereby permitting movement of effluent between the galleries.

Conveniently, the galleries further include means to suspend a drainpipe from the main body portions of the galleries. Each of the suspension devices includes a suspension strap adapted to be positioned under the drainpipe and releasably attached in an opening in the main body portion of an associated gallery. Each of the suspension devices further includes a cover for the opening which releasably secures the suspension straps to the main body portions within the openings.

In still another feature, the main body portion of each of the galleries has a corrugated configuration with a plurality of upstanding ribs spaced longitudinally therealong. The main body portion of each of the galleries has a plurality of vertical infiltration walls between the upstanding ribs. The infiltration walls include infiltration apertures formed therein allowing infiltration by effluent through the side walls of the main body portion into the adjoining ground.

In an alternative latching system, at least one gallery has a pair of end walls, one end wall at either end of the main body portion thereof. The main body portion of the adjoining gallery has an open end dimensionally sized to releasably attach to one end of the first gallery through mating of the latching systems of the first and second galleries.

The latching system is provided by end ribs of the plurality of ribs, the end ribs are adjacent the terminal ends of the main body portion and are dimensionally sized to mate with end ribs on adjoining galleries.

The invention will be more fully understood when reference is made to the following detailed description taken in conjunction with the accompanying drawings.

DETAILED DESCRIPTION OF THE PREFERRED EMBODIMENT

Figure 1:
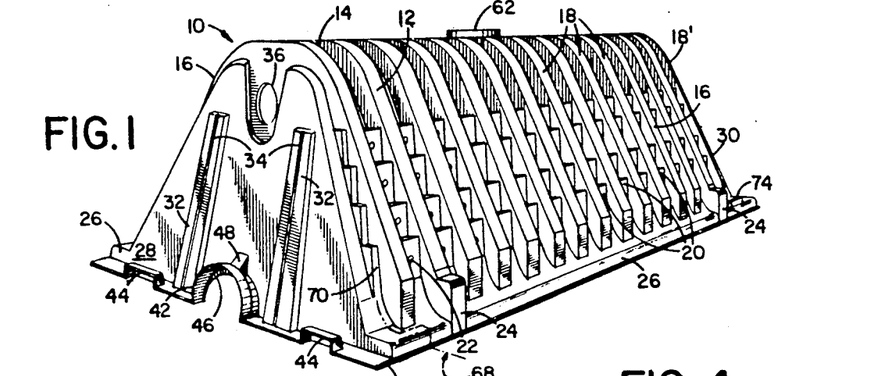
FIG. 1 is a perspective view of a leaching gallery embodying the present invention.

Referring first to FIG. 1, therein is illustrated a vacuum formed molded leaching gallery generally indicated by numeral 10 used for constructing an underground leaching or drain field. The leaching gallery 10 forms an enclosure and has a trapezoidal shape with an open bottom. The trapezoidal shape allows for molding draft and nesting type stacking. The gallery 10 is formed by a main body portion 12 having a top wall 14 and two downwardly inclined sidewalls 16. The main body portion 12 has a corrugated configuration with a plurality of upstanding, laterally extending ribs members 18 spaced longitudinally therealong. Formed on the sidewalls 16, in between adjacent ribs 18, are a plurality of vertical infiltration walls 20. Each of the infiltration walls 20 includes at least one infiltration aperture 22 formed therein for permitting effluent to drain from the interior of the leaching gallery 10. The sidewalls 16 also include nesting lugs 24 which allow the gallery 10 to be nested with other similar galleries without firmly locking thereto and facilitating separation thereof. The sidewalls 16 of the main body portion 12 terminate at base portions 26 extending longitudinally along the lower portion thereof. The base portions 26 are designed to support the gallery 10 on the ground.

Figure 6:
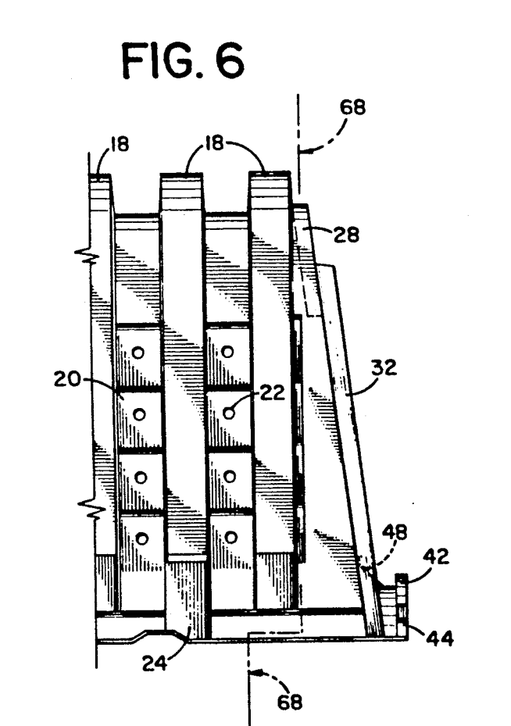
FIG. 6 is a partial side elevational view of the leaching gallery of the present invention.
Figure 7:
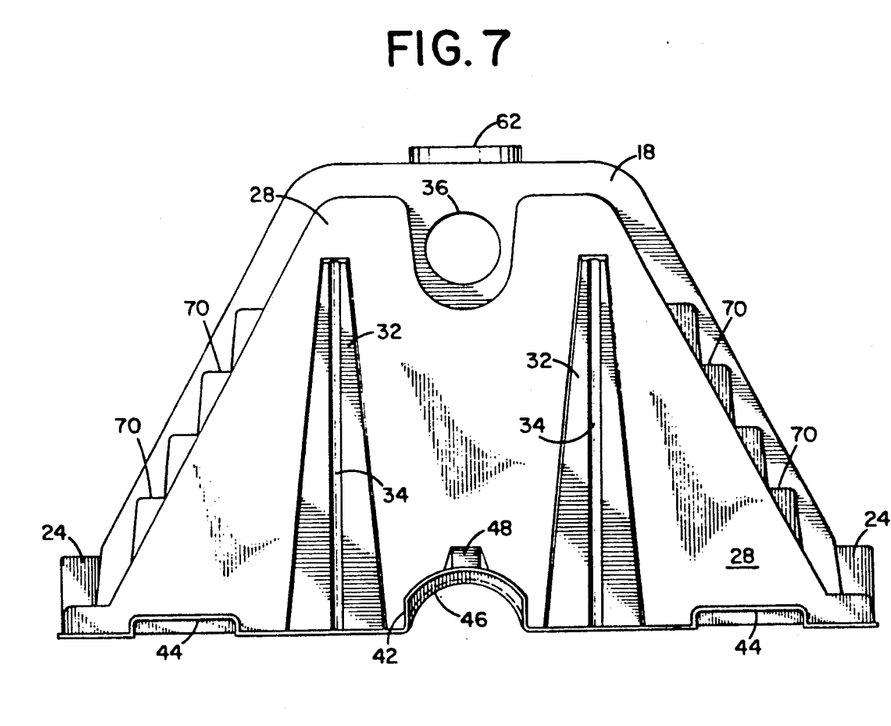
FIG. 7 is an end view of the leaching gallery of the present invention.

As best seen in FIGS. 1, 6 and 7, located on the ends of the main body portion 12 of the gallery 10 are inclined end walls 28, 30. As will be explained further hereinafter, the end walls 28, 30 are slightly different in form so that adjoining galleries can be coupled or mated together. Each end wall 28, 30 has vertically extending structurally raised struts 32 thereon with concave ribs 34 extending therealong. The struts 32 provided structural support for the end walls 28, 30 to increase their load carrying capacity. The end walls 28, 30 also each include an opening 36 for a perforated, polyvinylchloride drainpipe 38 (see FIG. 4) which extends therein through the entire interior of the gallery 10. At the lower terminal edge of the end wall 28 is a flange 40 dimensionally sized to mate with an associated flange 41A on the end wall 30A of an adjoining gallery 10A (see FIGS. 10-11). The flange 40 extends outwardly from the end wall 28 and includes upstanding protuberances dimensionally sized to mate with associated protuberances on the adjoining gallery 10A. The protuberances on flange 40 include an enlarged centrally located locking lug 42 with raised locking tabs 44 on either side thereof. The centrally located locking lug 42 at least partially surrounds an aperture 46 in the end wall 28. The aperture 46 permits movement of effluent between adjoining galleries when the galleries are joined together to form a drain field. The centrally located locking lug has a gusset 48 providing structural integrity thereto.

Figure 8:
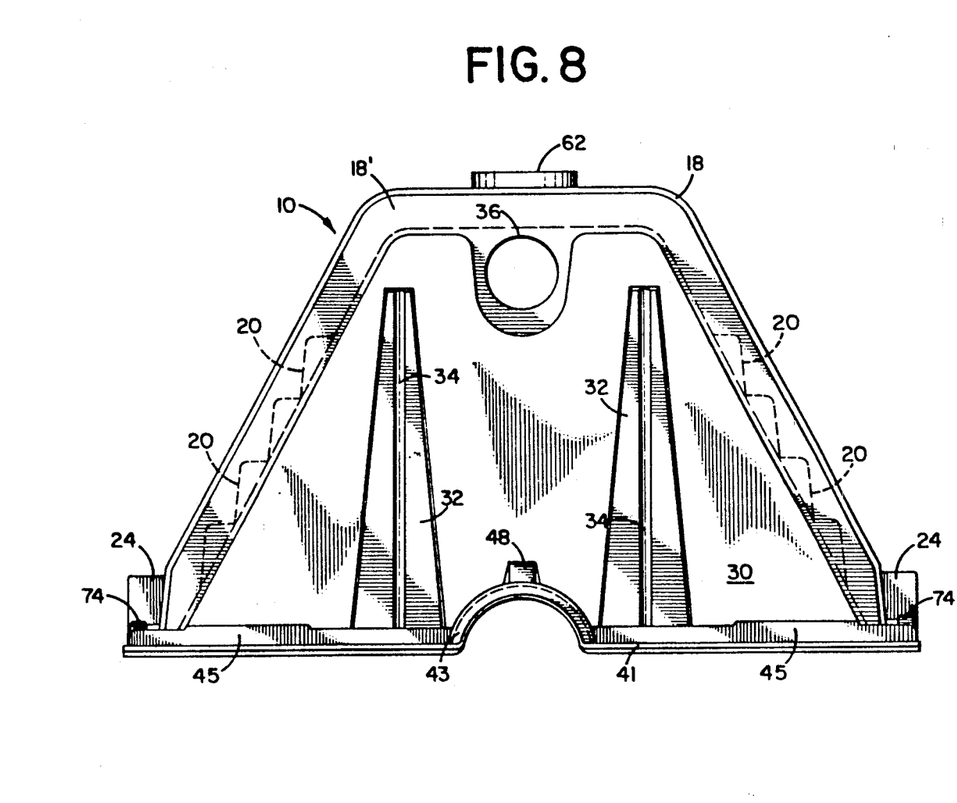
FIG. 8 is an end view similar to the view in FIG. 7 but showing the other end of the leaching gallery.
Figure 9:
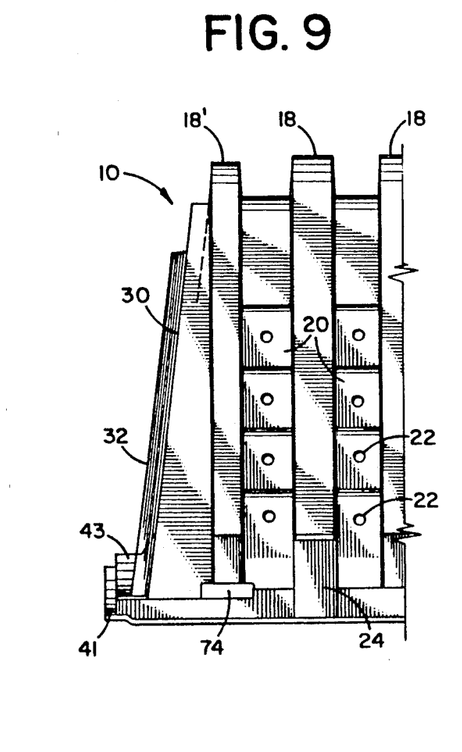
FIG. 9 is a partial side elevational view similar to the view in FIG. 6; however, showing the other end of the leaching gallery invention.
Figure 10:
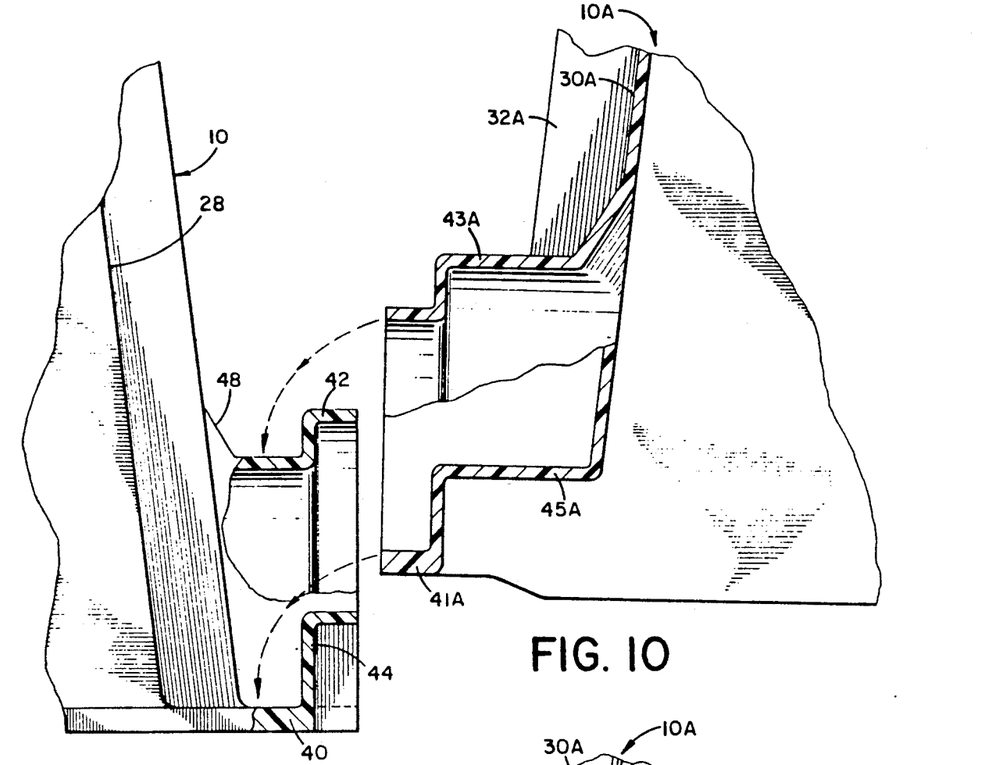
FIGS. 10 and 11 are partial side elevational views of two leaching galleries being fitted together during installation, with portions broken away to show internal structure.
Figure 11:
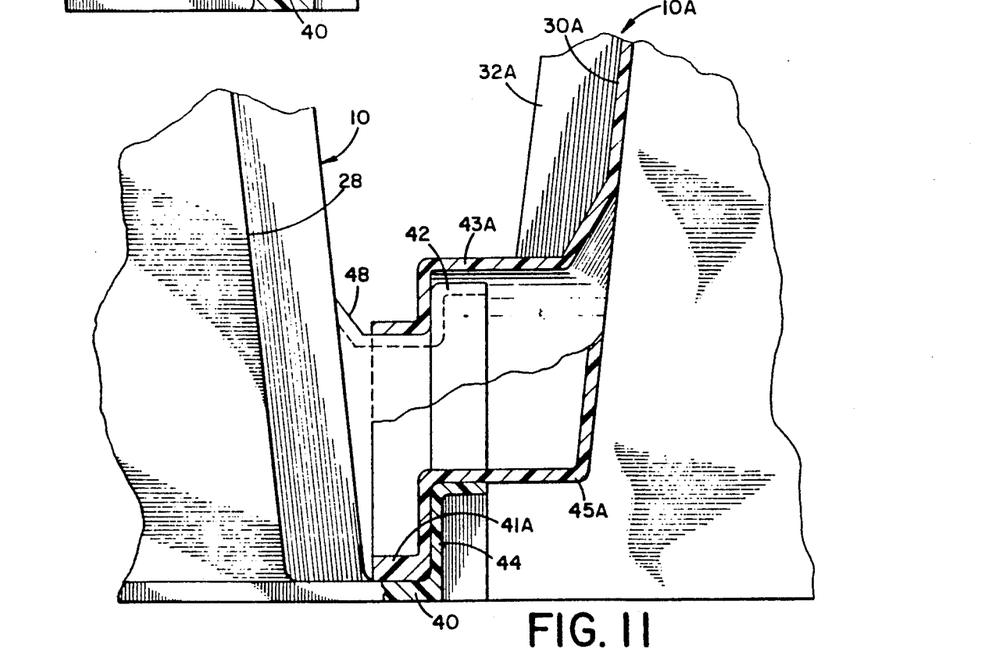

Turning now to FIGS. 8 and 9, therein is illustrated the other inclined end wall 30 of the gallery 10. This end wall 30 is similar to the previously described end wall 28; however, the flange 41 at the terminal end thereof is slightly raised as best seen in FIG. 8 and the centrally located locking lug 43 and locking tabs 45 are enlarged so that the gallery 10 can be lifted over and dropped into a seated latching engagement with the flange on an adjoining gallery. Such a procedure is shown in FIGS. 10 and 11, where the flange 41A of gallery 10A (identical to flange 41 on gallery 10) is lifted and seated into latching engagement with flange 40 of gallery 10. The locking lugs 42 and 43A interfit while the locking tabs 44 and 45A interfit.

Figure 2:
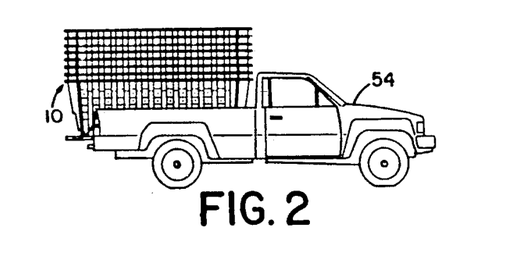
FIG. 2 is a side elevational view of a pickup truck with a plurality of nested leaching galleries of the present invention in the bed thereof.
Figure 3:
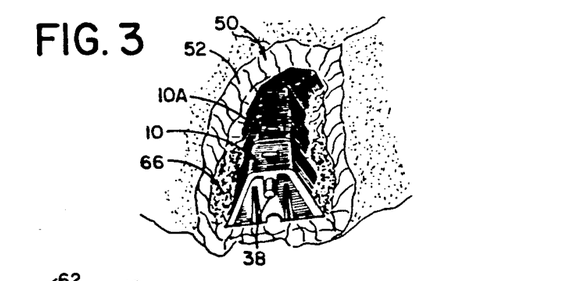
FIGS. 3 and 4 are perspective views of different portions of the leaching field of the present invention with the surrounding dirt and gravel broken away to illustrate internal gallery structure.
Figures 4, 5:
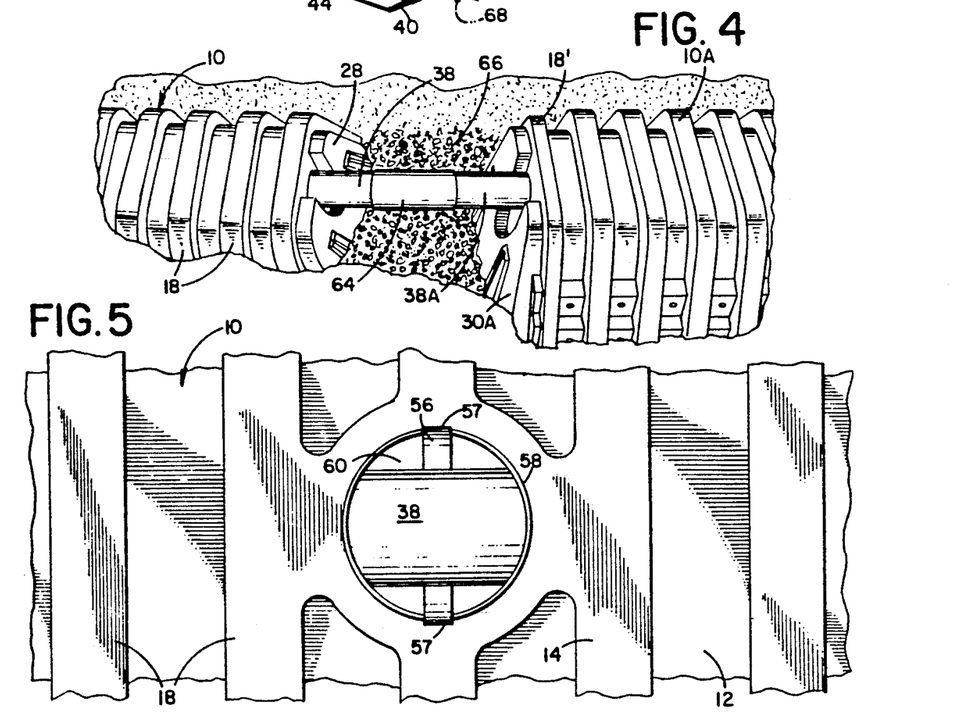
FIG. 5 is a partial top view of the leaching gallery of the present invention showing the inspection or clean out opening with the cover removed.

As illustrated in FIG. 3, in constructing the leaching or drain field as generally indicated by numeral 50, a trench 52 is dug by a backhoe and the plurality of galleries, which have been conveniently brought to the construction site in a nested condition in the bed of a pickup truck 54 as shown in FIG. 2, are positioned on the bottom of the trench 52 in end-to-end relationship. The galleries make it unnecessary to put gravel at the bottom of the trench so they rest directly on the ground. The adjoining galleries are lifted and dropped onto one another using the procedure illustrated in FIGS. 10 and 11 coupling all the galleries one to another. A four inch (4") perforated polyvinylchloride drainpipe 38 is passed through the openings 36 in the end walls 28,30 and entirely through the peak of the gallery 10. An intermediate portion of the drainpipe is also suspended by a plastic suspension strap 56 having U-clips 57 which engage a raised lip 58 of a one foot (1') in diameter inspection opening or pump out port 60 located in the top wall 14 of the main body portion 12 as best seen in FIG. 5. A disk-shaped cover 62 is used to allow access to the inspection opening 60 and also holds the suspension strap 56 in position. The perforated drainpipe 38 is set at a proper pitch (approximately between two inches (2") and four inches (4") per hundred foot (100')) to achieve the desired effluent flow. As shown in FIG. 4, drainpipes 38 and 38A from adjoining galleries 10 and 10A can be joined by a junction pipe 64 so effluent can flow along the entire length of the drain field. While the four inch (4") polyvinylchloride drainpipe is preferably extended through the entire ridge of the gallery units and held by the suspension straps, alternatively, small segments of polyvinylchloride drainpipe can merely extend between the openings in the ends of adjoining galleries if desired.

To complete the installation, crushed stone gravel 66 is added to the trench 52 to permit lateral leaching and finally the entire structure is covered by a layer of tar paper, salt hay or woven plastic cloth and topsoil (not shown). Any number of galleries can be used to form the leaching field and the galleries can be set up in series or in parallel arrangement. The purpose of the galleries is to provide additional volume to the leaching field without using concrete forms or large amounts of heavy, expensive, hard-to-work-with gravel.

Figure 12:
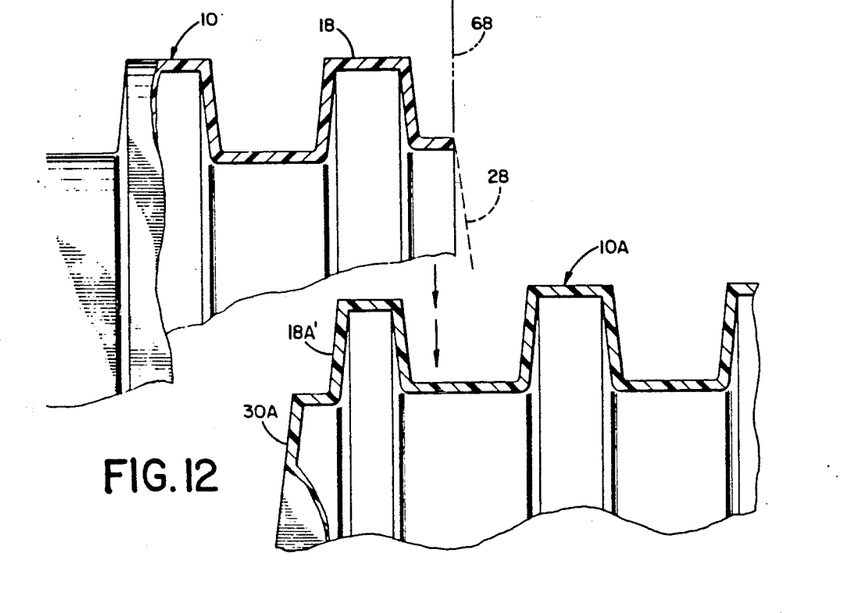
FIGS. 12 and 13 are partial side elevational views similar to FIGS. 10 and 11 but illustrating a second method of connecting two adjoining leaching galleries.
Figure 13:
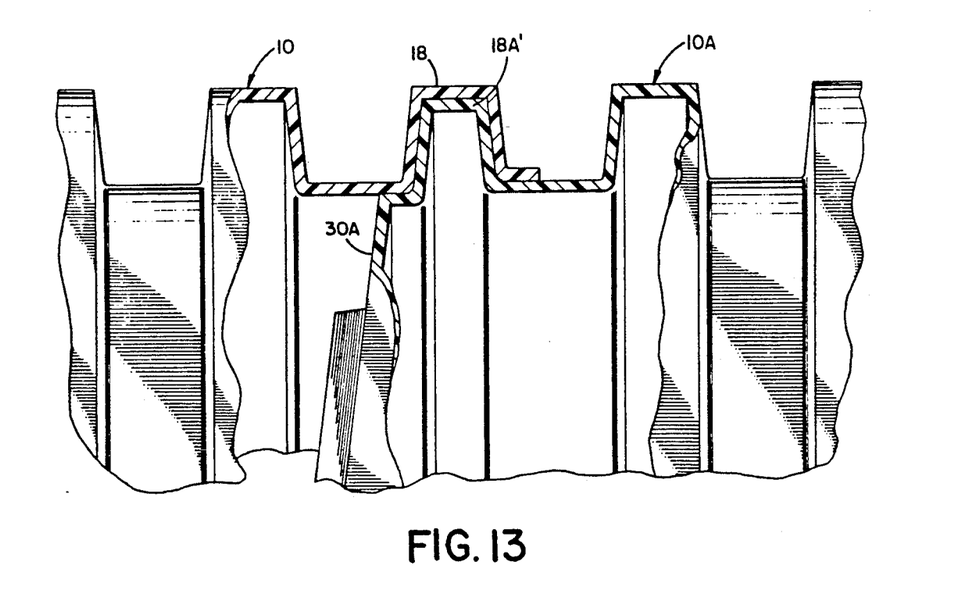
Figure 14:
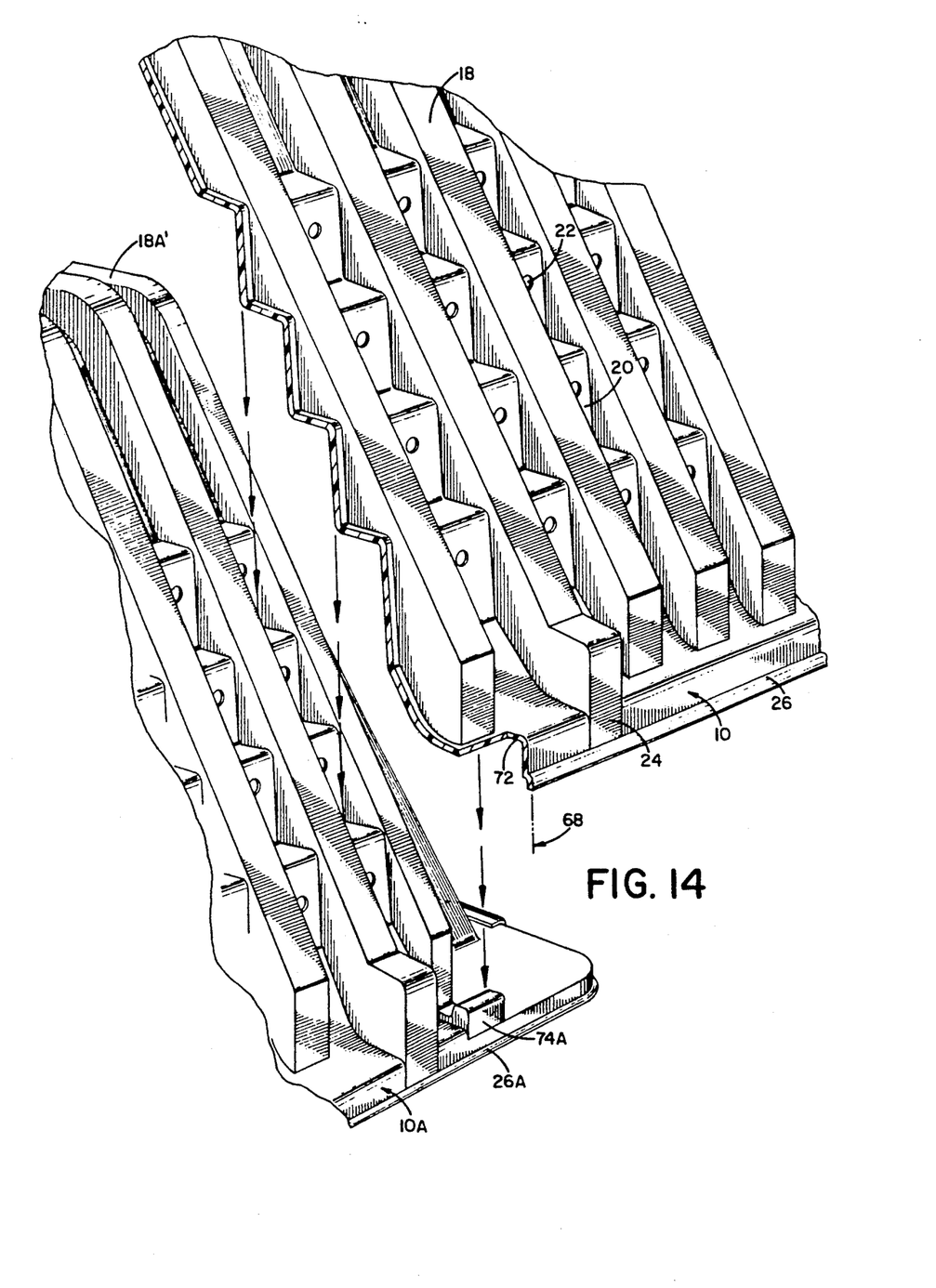
FIG. 14 is a perspective view showing the interfitting relationship of the galleries utilizing the second method of connecting the galleries.

In FIGS. 12–14, therein is illustrated a modified form of the drain field system of the present invention in which the adjoining leaching galleries are attached in a slightly different manner. With reference to FIG. 9, the rib 18' adjoining the end wall 30 of the gallery 10 is slightly smaller in height and width than the remaining ribs 18 thereon. To achieve the latching arrangement as shown in FIGS. 12 and 13, the end wall 28 (shown in dotted line) of gallery 10 is cut off with a razor along a cut-line 68 and discarded. As shown in FIGS. 1, 6 and 14, the cut-line 68 cuts through stepped support members 70 and provides notch 72 in each of the base portions 26 of the gallery 10. Thereafter, the gallery 10 can be lifted and dropped to securely latch with the adjoining identical gallery 10A as shown in FIGS. 13 and 14 with rib 18 seating on rib 18A'. Rib 18A' of gallery 10A is identical to rib 18' of gallery 10. The end wall 30A from gallery 10A provides support for both galleries. The stepped support members 70 will be supported on the associated stepped vertical walls 20 on gallery 10A while the notches 72 in the base portions 26 interfit with lugs 74A on the base portion 26A of gallery 10A thereby preventing the spread of the overlapping rib 18. The lugs 74A are identical to the lugs 74 on gallery 10 as shown in FIGS. 1 and 8. As will be apparent to those skilled in the art, the notches 72 could be apertures which mate with lugs 74A.

The drain or leaching field of the present invention can be installed in one-third (⅓) or one-half (½) the time required for traditional systems. Each gallery unit can be installed by hand by one or two individual workmen and requires no heavy equipment which makes it especially suitable for installation in remote locations. The present invention reduces the chance of serious injury encountered in concrete installations that require cable and chain lifting and positioning by heavy equipment.

The galleries of the present invention are preferably onepiece vacuum formed units integrally molded from a plastic resin such as rugged high density polyethylene but it should be apparent to those skilled in the art that it may be manufactured from other suitable materials which would not be adversely influenced by household sewage effluent, gases, chemicals in sewage or soil chemicals and would not rust, corrode, crack or decay.

The galleries of the present invention can be made in a variety of sizes necessary to accomplish any desired leaching condition. The preferred size is ninety-six inches (96") long, fifty inches (50") wide and thirty-two inches (32") high with a height to the bottom of the drainpipe openings of twenty-five inches (25"). Such a unit would weigh approximately eighty pounds (80 lbs.) and have a volume capacity of three hundred seventy-five (375) gallons (five hundred (500) gallons if surrounded with one foot (1') of crushed stone).

Units of this size can be used in a six foot (6') wide trench. The units can be easily nested for storage and transport. They save space over traditional systems while providing peak storage performance.

The drain field of the present invention is also useful for dispersing swimming pool backwash water, roof drain runoff and other clear water drainage applications. For such clear water applications, the crushed stone can be replaced by a filter fabric sold under the trademark ENKADRAIN by American Excelsior. The filter fabric is an expanded nylon which allows air seepage from the drain system.

Thus it can be seen from the foregoing specification and attached drawings that the lightweight gallery system of the present invention provides an effective means for dispersing of effluent, increases drain field capacity over traditional systems and facilitates installation of a drain field system.

The preferred embodiments admirably achieve the objects of the present invention; however, it should be appreciated that departures can be made by those skilled in the art without departing from the spirit and scope of the invention which is limited only by the following claims.

What is claimed is:

1. A drain field gallery for guiding liquid through a drain field and allowing liquid to seep into adjoining ground comprising:
    A. an elongated main body portion having an arch-shaped configuration thereby creating an enlarged enclosure;
    B. at least one end wall covering one end of said elongated main body portion, said at least one end wall having an opening therethrough dimensionally sized to accept a perforated drainpipe for transporting the liquid to said gallery; and C. a latching system associated with said at least one end wall for attaching said gallery to an adjoining gallery in an end-to-end relationship, said latching system including a flange on said at least one end wall, said flange being dimensionally sized to mate with an associated flange on an end wall of an adjoining gallery, and said flange is located at the lower terminal edge of said at least one end wall.

2. The drain field gallery in accordance with claim 1, wherein said flange extends outwardly from said at least one end wall and includes upstanding protuberances dimensionally sized to mate with associated protuberances on an adjoining gallery.

3. The drain field gallery in accordance with claim 2, wherein said protuberances include one enlarged centrally located locking lug with a locking tab on either side thereof.

4. The drain field gallery in accordance with claim 3, wherein said centrally located locking lug partially surrounds an aperture in said at least one end wall, and said aperture permits movement of effluent between adjoining galleries.

5. A drain field gallery for guiding liquid through a drain field and allowing liquid to seep into adjoining ground comprising:

A. an elongated main body portion having an arch-shaped configuration thereby creating an enlarged enclosure;

B. at least one end wall covering one end of said elongated main body portion, said at least one end wall having an opening therethrough dimensionally sized to accept a perforated drainpipe for transporting the liquid to said gallery; and C. a latching system associated with said at least one end wall for attaching said gallery to an adjoining gallery in an end-to-end relationship, said latching system being provided by end ribs adjacent terminal ends of said main body portion and dimensionally sized to mate with end ribs on adjoining galleries, said latching system further including means to prevent spreading of adjoining galleries once latched to one another, said spreading prevention means including at least one lug on the lower terminal portion of said main body portion adapted to engage a portion on adjoining galleries.

6. In a drain field for allowing liquid to seep into adjoining ground, first and second drain field galleries, each gallery comprising:

A. an elongated main body portion having an arch-shaped configuration thereby creating an enlarged enclosure;

B. At least one end wall covering one end of said elongated main body portion, said at least one end wall having an opening therethrough dimensionally sized to accept a perforated drainpipe for transporting the liquid to said gallery; and C. a latching system associated with said at least one end wall for attaching said gallery to an adjoining gallery in an end-to-end relationship, said latching system of said first gallery including a flange on its at least one end wall, said flange being dimensionally sized to mate with an associated flange on said end wall of said second gallery, and wherein said flange and said associated flange are located at the lower terminal edges of said at least one end walls of said first and second galleries, respectively.

7. The drain field in accordance with claim 6, wherein said flange and said associated flange extend outwardly from said at least one end walls of said first and second galleries and each includes upstanding protuberances dimensionally sized to mate with protuberances on the other gallery to releasably secure said galleries together.

8. The drain field in accordance with claim 7, wherein said protuberances on each flange include one enlarged centrally located locking lug with locking tabs on either side thereof.

9. The drain field in accordance with claim 8, wherein each centrally located locking lug partially surrounds an aperture in said at least one end wall, and said aperture permits movement of effluent between said galleries.

10. In a drain field for allowing liquid to seep into adjoining ground, first and second drain field galleries, each gallery comprising:

A. an elongated main body portion having an arch-shaped configuration thereby creating an enlarged enclosure;

B. at least one end wall covering one end of said elongated main body portion, said at least one end wall having an opening therethrough dimensionally sized to accept a perforated drainpipe for transporting the liquid to said gallery; and C. a latching system associated with said at least one end wall for attaching said gallery to an adjoining gallery in an end-to-end relationship, said latching system being provided by end ribs adjacent terminal ends of said main body portion and dimensionally sized to mate with end ribs on adjoining galleries, said latching system further including means to prevent spreading of adjoining galleries once latched to one another, said spreading prevention means including at least one lug on the lower terminal portion of said main body portion adapted to engage a portion on adjoining galleries.

11. In a drain field for allowing liquid to seep into adjoining ground,

A. a first terminal gallery comprising:
  i. a first elongated main body portion having an arch-shaped configuration thereby creating an enlarged enclosure, said elongated main body portion having first and second ends;
  ii. first and second end walls respectively covering said first and second ends of said first elongated main body portion, each of said end walls having an opening therethrough for transporting the liquid to and from said first gallery; and
  iii. a first latching engagement system associated with said first end wall for attaching said terminal gallery to an adjoining gallery in an end-to-end engaged relationship, said latching engagement system including a first rib on said first terminal gallery main body portion adjacent said first end wall, said rib being dimensionally sized to mate engagingly with an associated rib on an adjoining gallery;

B. a second adjoining drain field gallery having only one end wall at its distal end, comprising:
  i. a second elongated main body portion having an arch-shaped configuration thereby creating an enlarged enclosure, said second elongated main body portion having two opposed ends;
  ii. a third end wall covering one opposed distal end of said second elongated main body portion, said third end wall having an opening therethrough for transporting the liquid to an adjoining gallery; and iii. a second latching engagement system associated with the other opposed proximal end for attaching said second adjoining gallery to said first terminal gallery in an overlapping end-to-end engaged relationship, said second latching engagement system including a second rib on said second adjoining gallery main body portion adjacent the other opposed proximal end, said second rib being dimensionally sized to vertically seat engagingly on said first rib of said first terminal gallery whereby said first and second galleries are engagingly latched together thereby preventing relative longitudinal movement therebetween, said first and second latching systems further including means to prevent lateral spreading of said first terminal gallery and said second adjoining gallery once said galleries are latched to one another, including said first end wall inhibiting lateral spreading of said first gallery and of said adjoining second gallery and restraining said arch-shaped configuration against deformation; and C. a drain pipe extending through at least one of said openings in said first, second and third end walls for transporting liquid to the drain field.

12. A drain field gallery for guiding liquid through a drain field and allowing liquid to seep into adjoining ground comprising:

A. an elongated main body portion having an arch-shaped configuration thereby creating an enlarged enclosure, and having means forming an opening therein;

B. at least one end wall covering one end of said elongated main body portion, said at least one end wall having an opening therethrough dimensionally sized to accept a drainpipe for transporting the liquid to said gallery;

C. a latching engagement system associated with said at least one end wall for attaching said gallery to an adjoining gallery in an end-to-end engaged relationship, said latching system being dimensionally sized to vertically seat in latching engagement on the latching system of the adjoining gallery and to inhibit relative longitudinal movement between the galleries, said at least one end wall inhibiting lateral spreading of said gallery and of said adjoining gallery and restraining said arch-shaped configuration against deformation;

D. further including means to suspend a drainpipe from said main body portion of said gallery, comprising a suspension strap adapted to be positioned under a drainpipe and releasably attached in said opening in said main body portion; and E. a cover for said opening which releasably secures said suspension strap to said main body portion within said opening.

13. In a drain field for allowing liquid to seep into adjoining ground, first and second drain field galleries, each gallery comprising:

A. an elongated main body portion having an arch-shaped configuration thereby creating an enlarged enclosure, and having means forming an opening therein;

B. at least one end wall covering one end of said elongated main body portion, said at least one end wall having an opening therethrough dimensionally sized to accept a drainpipe for transporting the liquid to said gallery;

C. a latching engagement system associated with said at least one end wall for attaching said gallery to an adjoining gallery in an end-to-end engaged relationship, said latching system of each gallery being dimensionally sized to vertically seat engagingly on the latching system of the adjoining gallery and to inhibit longitudinal movement between adjoining galleries;

D. further including means to suspend a drainpipe from said main body portions of said galleries, comprising a suspension strap adapted to be positioned under a drainpipe and releasably attached in said opening in one said main body portion; and E. a cover for each said opening which releasably secures said suspension straps to said main body portions within said openings, whereby said latching system of one of said first and second galleries vertically seats on the other of said first and second galleries thereby inhibiting longitudinal movement of said galleries relative to one another, said at least one end wall inhibiting lateral spreading of said gallery and of said adjoining gallery and restraining said arch-shaped configuration against deformation.

14. In a drain field for allowing liquid to seep into adjoining ground, first and second drain field galleries, each gallery comprising:

A. an elongated main body portion having a corrugated arch-shaped configuration thereby creating an enlarged enclosure, with a plurality of upstanding ribs spaced apart longitudinally therealong;

B. at least one end wall covering one end of said elongated main body portion, said at least one end wall having an opening therethrough dimensionally sized to accept a drainpipe for transporting the liquid to said gallery;

C. a latching engagement system associated with said at least one end wall for attaching said gallery to an adjoining gallery in an end-to-end engaged relationship, said latching system of each gallery being dimensionally sized to vertically seat engagingly on the latching system of the adjoining gallery and to inhibit longitudinal movement between adjoining galleries;

D. wherein said main body portion of each of said galleries has a plurality of vertical infiltration walls separated by horizontal steps between said upstanding ribs, and each infiltration wall includes at least one infiltration aperture formed therein; and E. wherein said latching engagement system is provided by end ribs of said plurality of ribs, and said end ribs are adjacent the terminal ends of said main body portion and are dimensionally sized to mate engagingly with end ribs on adjoining galleries, whereby said latching system of one of said first and second galleries vertically seats on the other of said first and second galleries thereby inhibiting longitudinal movement of said galleries relative to one another, said at least one end wall inhibiting lateral spreading of said gallery and of said adjoining gallery and restraining said arch-shaped configuration against deformation.

15. In a drain field for allowing liquid to seep into adjoining ground,

A. A first gallery comprising i. a first elongated main body portion having an arch-shaped configuration thereby creating an enlarged enclosure, said first elongated main body portion having first and second ends;

ii. first and second end walls respectively covering said first and second ends of said first elongated main body portion, each of said end walls having an opening therethrough for transporting the liquid to and from said first gallery; and iii. a first latching engagement system associated with said first end wall for attaching said gallery to an adjoining gallery in an end-to-end engaged relationship, said first latching engagement system including a first rib on said first main body portion adjacent said first end wall, said rib being dimensionally sized to mate engagingly with an associated rib on an adjoining gallery;

B. a second adjoining drain field gallery having only one end wall at its distal end, comprising:

i. a second elongated main body portion having an arch-shaped configuration thereby creating an enlarged enclosure, said second elongated main body portion having two opposed ends;

ii. a third end wall covering one opposed distal end of said second elongated main body portion, said third end wall having an opening therethrough for transporting the liquid to an adjoining gallery; and iii. a second latching engagement system associated with the other opposed proximal end for attaching said second gallery to said first gallery in an overlapping end-to-end engaged relationship, said second latching engagement system including a second rib on said second main body portion adjacent the other opposed proximal end, said second rib being dimensionally sized to vertically seat engagingly on said first rib of said first gallery whereby said first and second galleries are engagingly latched together thereby preventing relative longitudinal movement therebetween, and said first end wall inhibiting lateral spreading of said first gallery and of said adjoining second gallery and restraining said arch-shaped configuration against deformation;

C. a drain pipe extending through at least one of said openings in said first, second and third end walls for transporting liquid to the drain field;

D. said latching systems further including means to prevent spreading of said adjoining first and second galleries once latched to one another, including at least one lug on a lower terminal portion of said first main body portion adapted to engage a cutout portion on a lower terminal portion of said second main body portion.

16. A drain field gallery for guiding liquid through a drain field and allowing liquid to seep into adjoining ground comprising:

A. an elongated main body portion having a corrugated arch-shaped configuration thereby creating an enlarged enclosure with a plurality of upstanding ribs spaced apart longitudinally therealong;

B. at least one end wall covering one end of said elongated main body portion, said at least one end wall having an opening therethrough dimensionally sized to accept a drainpipe for transporting the liquid to said gallery;

C. a latching engagement system associated with said at least one end wall for attaching said gallery to an adjoining gallery in an end-to-end engaged relationship, said latching system being dimensionally sized to vertically seat in latching engagement on the latching system of the adjoining gallery and to inhibit relative longitudinal movement between the galleries, said at least one end wall inhibiting lateral spreading of said gallery and of said adjoining gallery and restraining said arch-shaped configuration against deformation, wherein said latching engagement system is provided by end ribs of said plurality of ribs, and said end ribs are adjacent the terminal ends of said main body portion and are dimensionally sized to mate engagingly with end ribs on adjoining galleries, whereby said latching system includes said one end wall as means to prevent spreading of adjoining galleries once latched to one another.

* * * * *